United States Patent [19]

San Hai

[11] Patent Number: 4,632,415
[45] Date of Patent: Dec. 30, 1986

[54] FORK ENDS AND HUB OF BICYCLE

[76] Inventor: Wang San Hai, No. 3, 1 Alley, 658 Lane, Chung-Shan Rd., Taoyuan, Taiwan

[21] Appl. No.: 665,738

[22] Filed: Oct. 29, 1984

[51] Int. Cl.$^4$ .............................................. B62K 25/02
[52] U.S. Cl. ........................................ 280/279; 301/1; 301/126
[58] Field of Search ............... 280/279, 277, 270, 288; 384/512, 504, 506; 301/126, 1, 2.5

[56] References Cited

U.S. PATENT DOCUMENTS

| | | | |
|---|---|---|---|
| 6,337 | 4/1888 | Perret | 280/277 |
| 15,356 | 5/1898 | Jones | 280/277 |
| 2,018,973 | 10/1935 | Pomeroy | 280/270 |
| 2,724,624 | 11/1955 | Barr | 384/512 |
| 4,089,570 | 5/1978 | Markfelder et al. | 384/512 |

FOREIGN PATENT DOCUMENTS 86372 10/1935 Austria .............................. 280/288.1

Primary Examiner—John J. Love
Assistant Examiner—Mark C. Dukes

[57] ABSTRACT

A hub and fork ends of bicycle includes a pair of annular bearings each fixed within an annular bearing shell fixed on the fork end and each composed of an outer race and an inner race formed by engaging a first ring with a second ring, a hub formed with several grooves and a spindle formed with several lengthy extensions corresponding to the grooves on the hub so that after passing the spindle through the two bearings and the hub, the hub with a bike wheel can be instantly mounted on the front fork of a bicycle.

1 Claim, 4 Drawing Figures

FORK ENDS AND HUB OF BICYCLE

BACKGROUND OF THE INVENTION

Conventional bicycle provides a front fork having two legs, each being formed with a slot on the lower end of the leg for fixing the spindle and front wheel of a bicycle, which however has the following defects:

1. When riding the bicycle, the vibrational force may easily loosen the spindle or even release the spindle from the open slots of the fork legs to cause accident for the bike rider.
2. When mounting the spindle on a bike, special care must be taken to fit it horizontally and precisely on the fork ends, to thereby cause inconvenience for the bike user.

The present inventor has found the defects of a conventional bike fork and invented the present fork ends and hub.

SUMMARY OF THE INVENTION

The object of the present invention is to provide a pair of fork ends each fixed with an annular bearing in an annular bearing shell, a hub centrally formed with a transverse hole having several transverse grooves, and a spindle having several lengthy extensions corresponding to the transverse grooves on the hub so that the spindle may be inserted through two annular bearings formed on the two fork ends and engaged with the hub to instantly fix a front wheel on the front fork of a bicycle for its safe running.

DETAILED DESCRIPTION

Figures 1, 3:
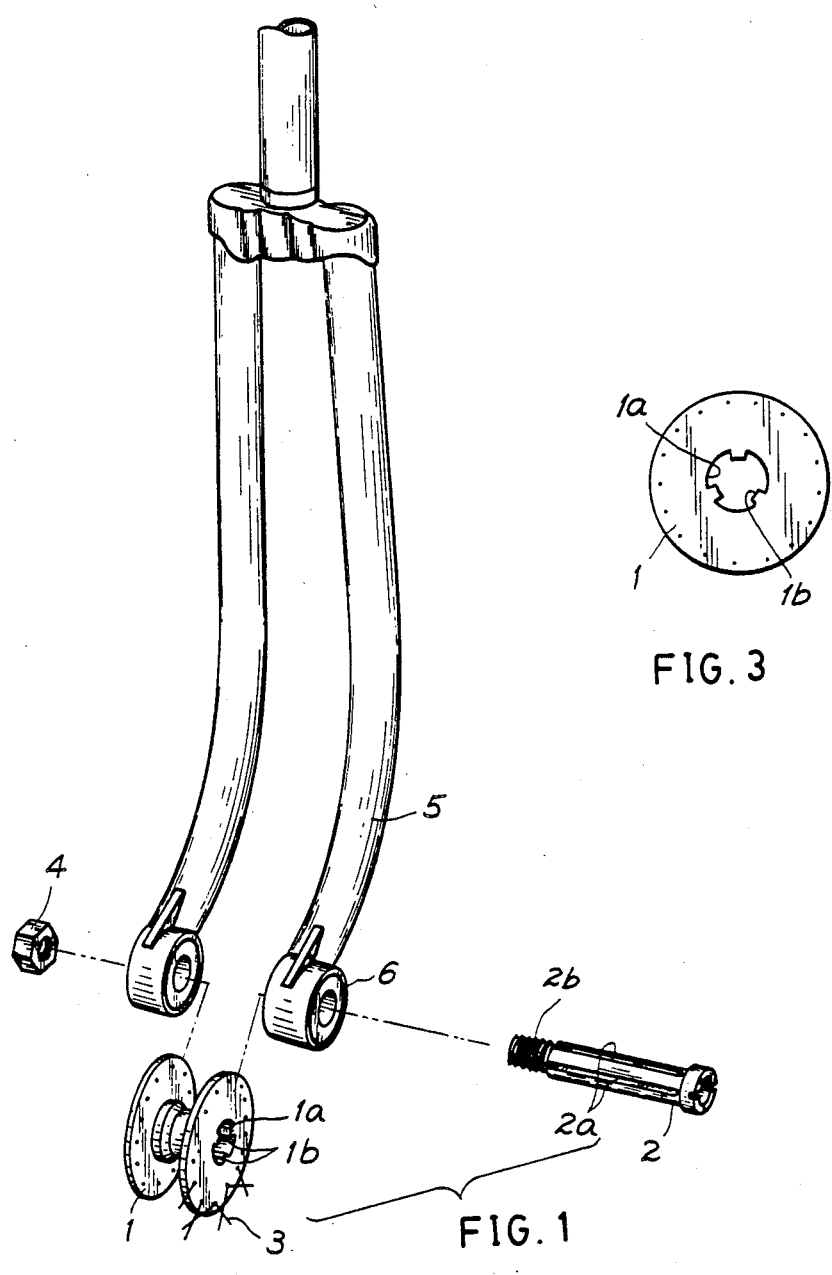
FIG. 1 is an illustration showing all elements constructing the present invention.
FIG. 3 is a side-view drawing of the hub of the present invention.
Figure 2:
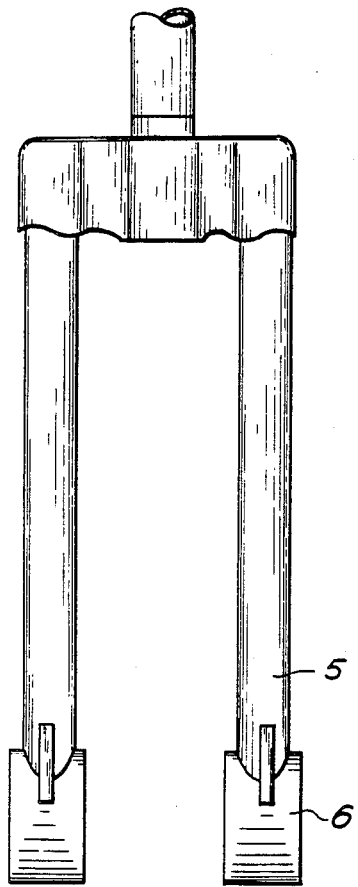
FIG. 2 is a front view drawing of the front fork in accordance with the present invention.

As shown in the figures, the present invention comprises: a pair of fork ends each formed on the lower portion of each leg 5 of the front fork and each fixed with an annular bearing sheel 6; a pair of annular bearings, each composed of an outer race 11 fixed within the inside cylindrical hole 6a of annular bearing shell 6, an inner race combined by a first ring 8 with a second ring 9 and a plurality of balls 7 movably arranged within a pair of ball retaining spaces 10, 10a defined by the inner race of two rings 8, 9 and the outer race 11; a hub 1 having spoke of a bike wheel and formed with several transverse grooves 1a through the central hole 1b; and a spindle 2 having several lengthy extensions 2a corresponding to the transverse grooves 1a and formed with male-threaded end 2b so that after being inserted through two annular bearings and the hub 1, the spindle 2 can be fixed by a nut 4 on the front fork of a bike.

Figure 4:
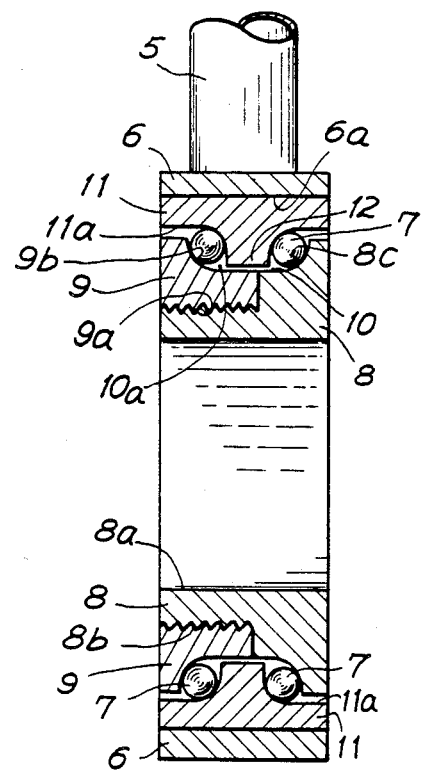
FIG. 4 is a sectional drawing of the fork end of the present invention.

The first ring 8 is formed with a central hole 8a for passing spindle 2 and formed with a male-threaded portion 8b and an annular groove 8c. The second ring 9 is formed with a female-threaded hole 9a engaged with the male-threaded portion 8b and formed with an annular groove 9b. The two annular grooves 8c, 9b form a common ball seating surface as shown in FIG. 4 within the annular hole 11a of the outer race 11. An annular rib 12 is formed on the central portion of the annular hole 11a and extends towards the common ball seating surface formed by both annular grooves 8c, 9b to separate into two ball retaining spaces 10, 10a.

When assembling the elements of the present invention, the two annular bearings each composed of inner race of first ring 8 and second ring 9 and outer race 11 are respectively fixed within the two annular bearing shells 6 formed on the fork ends and the spindle 2 is inserted through the two bearings, the hub 1 and then fixed by a nut 4 so as to instantly mount the hub 1 with a bike wheel on the front fork.

The present invention has the following advantages superior to conventional bike fork and hub:

1. The assembling or dismantling of the hub, bearings and spindle of the present invention is quicker and convenient since each annular bearing can be quickly combined by engaging first ring 8 with second ring 9 and each bearing is definitely positioned on the fork end so that the spindle and hub can be instantly mounted on the fork ends without care of their alignment or adjustment.
2. The annular shell 6 is a closed loop and can prevent loosing or releasing of wheel, hub and spindle from the fork ends.

I claim:

1. A hub and fork ends of a bicycle comprising:
   a pair of fork ends each formed on the lower portion of each leg of a front fork of a bicycle and each fixed with an annular bearing shell;
   a pair of annular bearings each fixed within an inside cylindrical hole of a respective one of each said annular bearing shell;
   a hub having spokes of a bike wheel; and
   a spindle formed with a male-threaded end to be fixed by a nut on the fork ends;
   the improvement which comprises:
   each said annular bearing including: an outer race fixed within said annular bearing shell and formed with an annular hole therein and extending an annular rib from the central portion of said annular outer race; an inner race comprising a first ring which is formed with a central hole for receiving said spindle, a male-threaded portion and an annular groove thereon, and a second ring which is formed with a female-threaded hole engaged with said male-threaded portion of said first ring and another annular groove which forms a common ball seating surface with said annular groove of said first ring within said annular hole of said outer race to define a pair of ball retaining spaces with said annular hole of said outer race as separated by said annular rib of said outer race; and
   a plurality of balls movably arranged within said pair of ball retaining spaces;
   said hub formed with several transverse grooves through a central hole in said hub; and
   said spindle formed with several lengthy extensions corresponding to said transverse grooves so that after passing said spindle through said pair of annular bearings and said hub, said hub with a bike wheel can be instantly fitted on the fork ends by said nut.

* * * * *